United States Patent Office 3,484,176
Patented Dec. 16, 1969

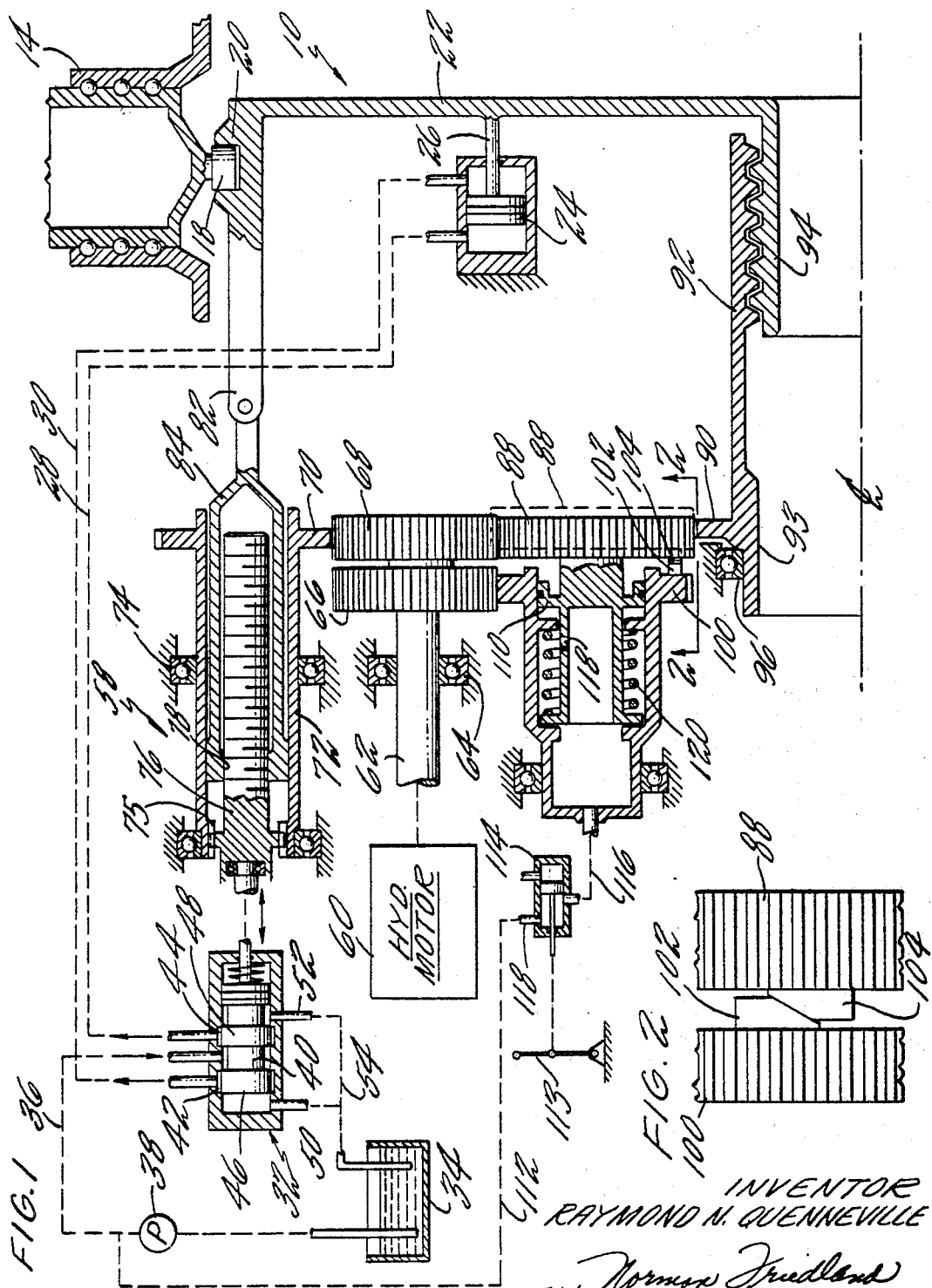

3,484,176
ACTUATOR WITH STOP THEREFOR
Raymond N. Quenneville, Suffield, Conn., assignor to United Aircraft Corporation, East Hartford, Conn., a corporation of Delaware
Filed Dec. 4, 1967, Ser. No. 687,840
Int. Cl. B63h 1/06, 5/12; F15b 9/10
U.S. Cl. 416—156            11 Claims

ABSTRACT OF THE DISCLOSURE

The pilot valve of an actuator is controlled by a cooperating screw-nut drive having the screw rotatably driven to position the pilot valve and the nut axially driven by the actuator to null out the pilot valve. A positive stop comprising engaging lugs on a differential speed gear train overloads the rotating driving mechanism for freezing the hydraulic system and locking the actuator at a predetermined position. The threads of the screw-nut are always in position to engage locking the actuator if the pressure of the hydraulic fluid is insufficient.

BACKGROUND OF THE INVENTION

This invention relates to servo actuators and more particularly to locking means therefor.

Patent No. 3,212,586, granted on Oct. 19, 1965, entitled "Pitch Control System" discloses a nut-screw type hydraulic actuator used to control the pitch of the blades of the aeronautical propeller. This patent also discloses means for providing a low pitch stop of the type that includes the customary retractable stop fingers cooperating with a cylinder portion connected to the actuator. While this system has proven to be satisfactory in the past, I have found that the pitch stop can be simplified by utilizing the existing components of the propeller.

According to this invention, the already existing nut-screw driving mechanism and hydraulic system is utilized for the low pitch stop. Camming means mounted between the input rotary signal and the output actuator imposes a load on the input motor at a predetermined actuator position causing the motor to stall and freeze the hydraulic system to hold the actuator in place. The threads of nut and screw portion of the actuator always being in interference, prevent the actuator from moving should the hydraulic fluid be insufficient to hold the actuator in place.

SUMMARY OF INVENTION

A primary object of tthis invention is to provide an improved stop for a hydraulic nut-screw type of actuator.

In accordance with this invention camming means interposed between the input and output of a nut-screw type of hydraulic actuator renders the input signal inoperative at a predetermined actuator position.

A still further object of this invention is to provide for an aeronautical type of propeller low pitch stop means which utilize existing hardware.

Other features and advantages will be apparent from the specification and claims and from the accompanying drawings which illustrate an embodiment of the invention.

BRIEF DESCRIPTION OF THE DRAWING

FIGURE 1 is a view partly in section, partly in elevation and partly in schematic illustrating the details of the invention.

FIGURE 2 is a fragmentary sectional view illustrating the camming means.

DESCRIPTION OF THE PREFERRED EMBODIMENT

While the invention is described in its preferred embodiment for actuating an aeronautical propeller, it will be obvious to one skilled in the art that this invention can be employed to actuate other embodiments, say for example, rudders, wing flaps, other control surfaces for aircraft and nonaircraft devices.

Referring now to FIG. 1, the propeller is generally illustrated by numeral 10 as having a hub mounted about the rotational axis, shown as the centerline and supporting a plurality of propeller blades 14 (only one being shown). For more detailed information regarding the construction of the hub, propeller, and blades, reference is hereby made to Patent No. 3,212,586 and the other patents noted therein are also incorporated by reference. Roller 18 suitably supported to the root of blade 14 fits into yoke 20 of the support structure 22 which is actuated by piston 24 via the actuating rod 26. Application of hydraulic fluid to either side of the piston, as schematically shown, serves to move support structure 22 rectilinearly and changing rotating blade 14 about its pitch change axis.

Hydraulic fluid is directed to either side of piston 24 via the schematically shown lines 28 and 30 which are connected to high pressure fluid by virtue of the pilot valve generally indicated by numeral 32. As schematically illustrated, fluid from reservoir 34 is pumped into the pilot valve 32 via line 36 by the schematically shown pump 38. Movement of spool 40 moves lands 46 and 48 to uncover annulus 42 or 44 respectively for simultaneously directing high pressure into line 28 and low pressure into drain line 50 or 52 where it is returned to the reservoir 34 via line 54.

The positioning of spool 40 is accomplished by the nut-screw actuating mechanism generally illustrated by numeral 58. Thus, positioning of lands 46 and 48 of spool 40 relative to ports 42 and 44 position piston 24 rectilinearly to change pitch of the propeller blades. The position of spool 40 is controlled by hydraulic motor illustrated in blank by numeral 60 as will be explained hereinbelow. An input signal applied to motor 60 serves to rotate shaft 62 rotatably supported by bearing 64 and carrying spur gears 66 and 68. Spur gear 68 meshes with spur gear 70 for driving hollow shaft 72 supported by roller bearings 74. Hollow shaft 72 in turn is splined via spline 75 to the screw 76 which in turn is threadably engaged to the nut portion 78. It is therefore apparent that rotation of shaft 72 imparts rotating motion to screw 76 and since the load on the nut 78 is larger than the load imposed by the spool 40, spool 40 is translated rectilinearly within pilot valve 32 for directing flow through lines 28 and 30 to act on piston 24.

Feedback is accomplished through connection link 82 rigidly connecting the support member 22 to the nut portion 78 via the extension member 84. This serves to position the nut in a direction opposite to the movement of the screw. Since the nut carries the screw, the screw is likewise positioned rectilinearly to reposition the spool 40 so that lands 46 and 48 fall line on line with ports 42 and 44 for nulling out the pilot valve. In the aircraft propeller application, the hydraulic motor would generally receive speed signals generated by a customary type of speed governor, not shown, but illustrated in the above-referenced patent.

Pinion gear 68 simultaneously drives spur gear 88 which meshes with gear 90 carried by the nut portion 92 of the hollow shaft 93 rotatably supported by bearings 96.

It will be appreciated that the threads of the nut portion 92 cooperate with the threads of the screw portion 94 suitably attached to the supporting structure 22. The nut and screw portion 92 and 94 are synchronously indexed to the nut and screw portion 76 and 78 so that both serve to follow the hydraulic actuator piston 24. As noted from FIG. 1, a gap between the threads of the nut 92 and screw 94 is evident so long as the hydraulic system is in operation.

In accordance with this invention low pitch stop is accomplished by a differential speed gearing system comprising gears 66 and 100 and gears 68 and 88. As noted, each gear is rotated in the same direction but having different gear ratios so that at a predetermined number of turns of the gears, the inwardly facing lugs 102 and 104 carried by gears 100 and 88 respectively, will contact each other as shown in FIG. 1 and load the gearing relative to shaft 62 to stall hydraulic motor 60. The angular position at which the lugs contact each other is indexed to the pitch of the blade 14 such that whenever the lugs are in contact, the motor will stall and pilot valve 32 will assume the null position and block hydraulic fluid within the chambers on opposite sides of piston 24 to lock it in place. In order to place the blade in the reverse pitch position, on-off valve is actuated by control lever 113 for conducting pressurized fluid to piston 110 via lines 112, on-off valve 114, line 116, passage 118 and annulus space 120. This pressure acts across the left face of piston 110 to create a force to move gear 88 to the right (as indicated in phantom) to disengage lugs 102 and 104. When this occurs, gears 88 and 68 are free to rotate unstalling the hydraulic motor and allowing the pilot valve to continue to direct fluid to the actuating piston 24 to rotate blades 14 in the reverse pitch range.

In order to bring the blades out of reverse, lever 113 is moved out of the reverse mode, causing valve 114 to resume the position as shown, discharging fluid from behind piston 110 to drain via the annular passage 120, passage 118, line 116, valve 114 and drain line 118.

To return the blades to the normal operating position, hydraulic motor 60 is actuated to cause shaft 62 to rotate in the opposite direction. The back faces of lugs 102 and 104 as shown in FIG. 2 are beveled so as to force gear 88 to move to the right against the load of spring 120 relative to gear 100 permitting the gears to rotate without overloading motor 60.

It should be understood that the invention is not limited to the particular embodiments shown and described herein, but that various changes and modifications may be made without departing from the spirit or scope of this novel concept as defined by the following claims.

What is claimed is:

1. A hydraulic actuator of the type having external and internal threaded members in threaded relation, the width of the teeth of said threaded members being dimensioned so that a gap is defined between teeth when out of engagement,
   an output member mounted for rectilinear movement connected to one of said threaded members,
   a pilot valve connected to the other of said threaded members for application of hydraulic fluid to said output member,
   input means for imparting rotary movement to one of said threaded members to translate the threaded member connected to said pilot valve to simultaneously apply fluid to the output member thereby translating the other threaded member, so as to maintain a gap between the threads of said threaded member,
   the improvement comprising,
   stop means for stopping said output member at a predetermined axial position of said output member,
   said stop means for rendering said input means inoperative at a predetermined angular position thereof.

2. A hydraulic actuator of the type claimed in claim 1 wherein said means for rendering said input means inoperative comprises
   a pair of parallelly spaced gears synchronously driven by said input means,
   inwardly facing lugs carried by said gears engaging each other at a predetermined angular value of said input means.

3. A hydraulic actuator of the type claimed in claim 1 including means for rendering said stop means inoperative to translate said output member beyond said predetermined axial position.

4. A hydraulic actuator of the type claimed in claim 3 wherein said means for rendering said stop means inoperative includes.
   hydraulic actuation means operable independently of said input means.

5. An actuation system comprising in combination a hydraulically actuated load member,
   control means normally held in a null position adapted to apply fluid to said load member for rectilinear motion,
   a first threaded member connected to said control means to position said control means relative to said null position,
   a second threaded member in threaded relation to said first threaded member connected to said load member for positioning said control member to the null position,
   a third threaded member operatively connected to said first threaded member and in synchronous movement therewith,
   a fourth threaded member in threaded relation with said third threaded member connected to said load member and movable therewith to maintain a gap between the threads thereof,
   stop means interposed between said first and second threaded members and said third and fourth threaded members to stop said load member at a predetermined position,
   and input means for imparting rotary movement to said first and third threaded members.

6. An actuation system as claimed in claim 5 wherein said stop means includes a pair of laterally spaced rotary members having different relative speeds and rotatable in the same direction,
   and camming means in said space engageable to render said input means inoperative.

7. An actuation system as claimed in claim 6 wherein said camming means includes lugs extending from the faces of said pair of rotary members, and each lug having a shoulder on one face engageable with eath other.

8. An actuation system as claimed in claim 7 wherein said lugs carry beveled sliding surfaces adapted to engage each other when said rotary members are rotated in an opposite direction.

9. An actuation system as claimed in claim 6 including retraction means operatively connected to one of said rotary members to disengage said camming means.

10. An actuation system as claimed in claim 9 wherein said retraction means includes a hydraulically actuated piston and means independent of said input means to actuate said piston.

11. For an aeronautical propeller having a hub and blades carried by said hub for pitch change movement,
    a hydraulically operated pitch change motor,
    control means normally held in a null position for applying fluid to said pitch change motor for varying the pitch thereof,
    a signal generator producing a rotary input signal,
    means operatively connected to said control means for connecting said rotary input signal to a linear movement,
    said last named means comprising,
    a first member connected to said control means,
    a second member operatively connected to said pitch change motor maintaining said control means at the null position,
    follower means between said signal generator and said hydraulic motor simulating the movement of said first member and said second member,
    said follower means including, a first threaded member operatively connected to said signal generator, a second threaded member connected to said pitch change motor, the threads of said first and second threaded members being normally out of engagement but engageable upon loss of hydraulic pressure in said pitch change motor, a low pitch stop having a pair of laterally spaced gears simultaneously driven by said signal generator, and lugs mounted on the opposing faces of said spaced gears engageable at a predetermined low pitch blade angle so as to render said signal generator inoperative.

References Cited

UNITED STATES PATENTS

| | | | |
|---|---|---|---|
| Re. 26,461 | 9/1968 | Barnes et al. | 170—160.32 |
| 2,496,369 | 2/1950 | Bagnuis | 91—380 |
| 3,027,949 | 4/1962 | Biermann | 170—160.32 X |
| 3,263,754 | 8/1966 | Beiliere | 170—160.32 |

EDWARD J. MICHAEL, Primary Examiner

U.S. Cl. X.R.

91—380